June 21, 1938.  E. DEGELMAN  2,121,626
CLUTCH ENGAGING AND DISENGAGING MECHANISM
Filed June 4, 1936  4 Sheets-Sheet 1

INVENTOR
EDWARD DEGELMAN
BY
Carl Miller
ATTORNEY

June 21, 1938.　　　　E. DEGELMAN　　　　2,121,626
CLUTCH ENGAGING AND DISENGAGING MECHANISM
Filed June 4, 1936　　　　4 Sheets-Sheet 2

INVENTOR
EDWARD DEGELMAN
BY
Carl Miller
ATTORNEY

June 21, 1938. E. DEGELMAN 2,121,626
CLUTCH ENGAGING AND DISENGAGING MECHANISM
Filed June 4, 1936 4 Sheets-Sheet 3
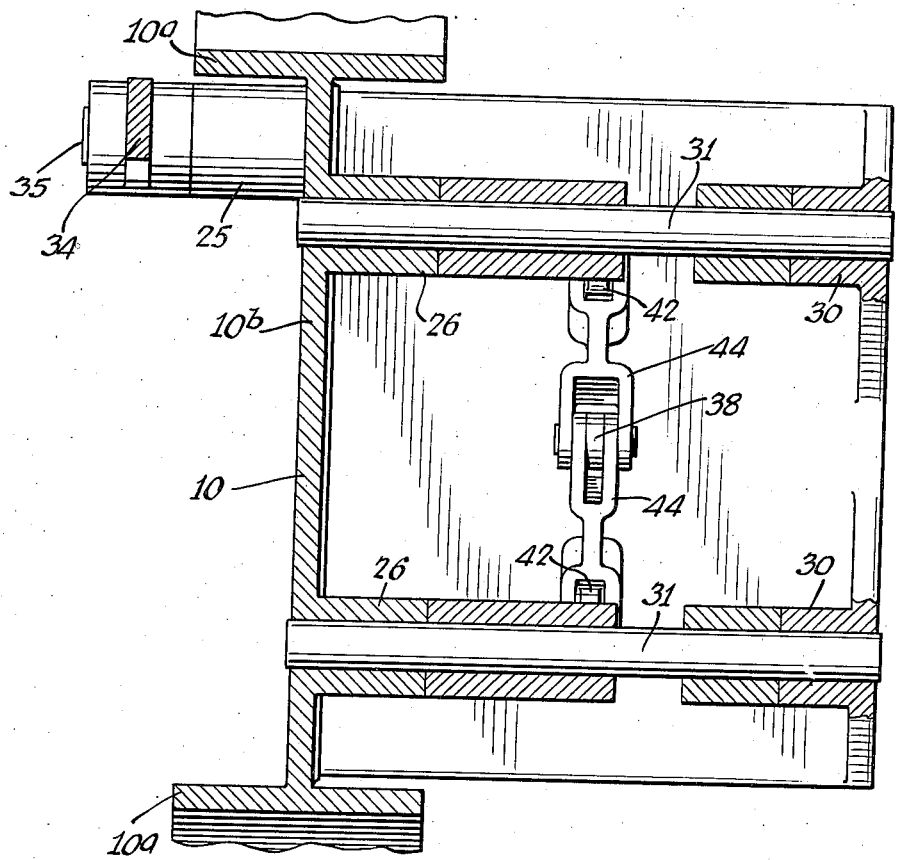
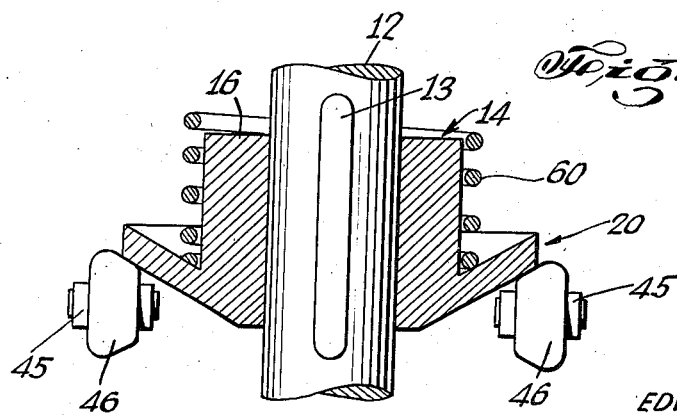
INVENTOR
EDWARD DEGELMAN
BY
Carl Miller
ATTORNEY

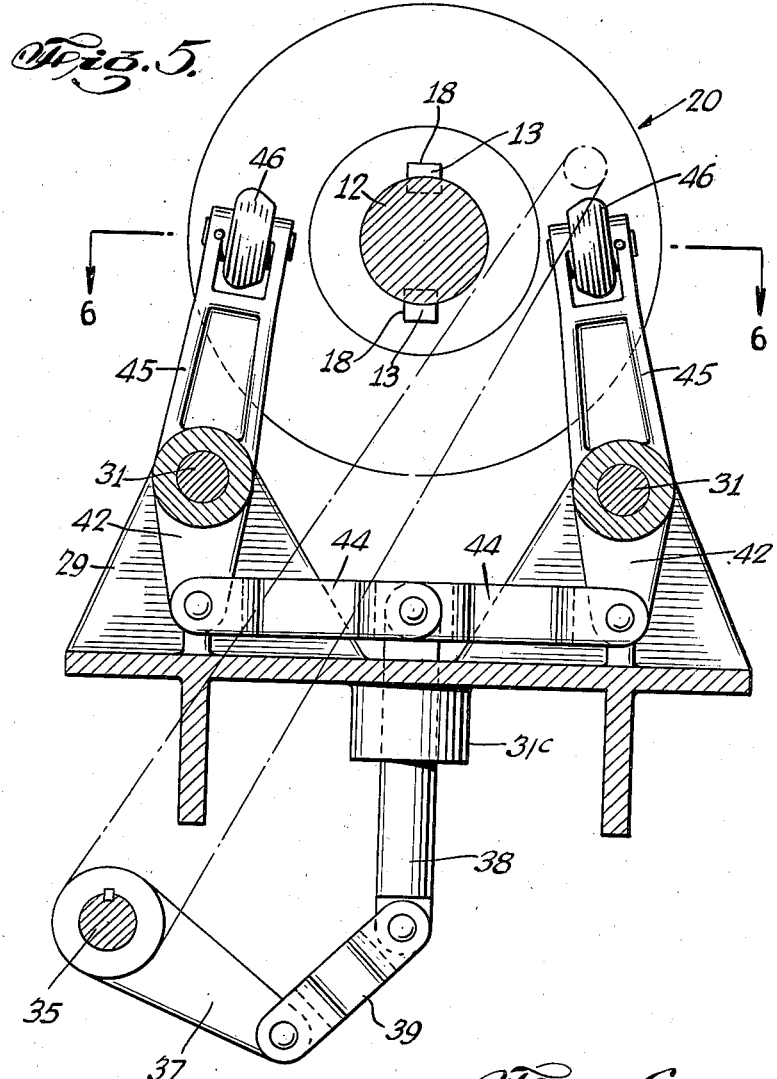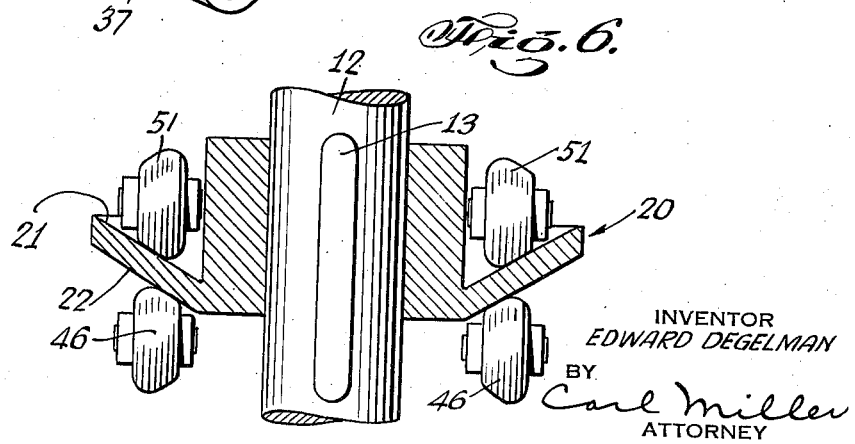

Patented June 21, 1938

2,121,626

UNITED STATES PATENT OFFICE 2,121,626

CLUTCH ENGAGING AND DISENGAGING MECHANISM

Edward Degelman, Secaucus, N. J.

Application June 4, 1936, Serial No. 83,528

12 Claims. (Cl. 74—107)

This invention relates to clutch operating devices.

An object of this invention is to provide a device of the character described, for moving a clutch part into and out of operating position, the construction being such that the clutch part is locked in any position to which it is moved, without danger of accidental movement.

A further object of this invention is to provide a rugged and durable clutch operating mechanism of the character described, which shall be relatively inexpensive to manufacture, simple and positive in operation and, withal, practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a clutch operating mechanism embodying the invention, with parts in cross-section;

Fig. 3 is a cross-sectional view taken on line 3—3 of Fig. 1;

Fig. 5 is a view similar to Fig. 2, but showing the parts in a different position;

Fig. 6 is a cross-sectional view taken on line 6—6 of Fig. 5; and

Fig. 7 is a cross-sectional view of the clutch part illustrating a modified construction.

Figure 1:
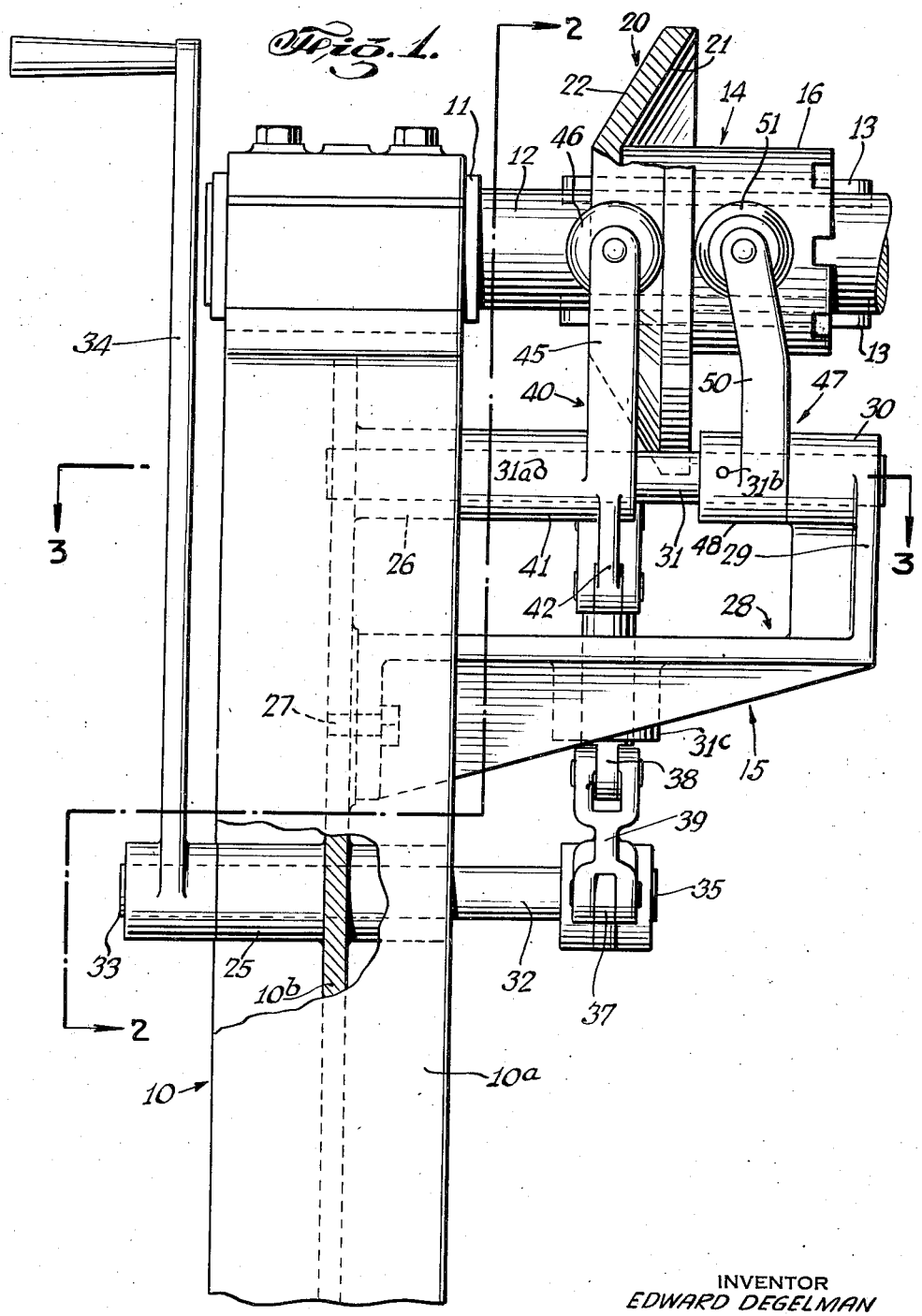

Referring now in detail to the drawings, 10 designates a frame provided with a bearing 11 journalling a rotary shaft 12, provided with a pair of longitudinal keys 13 to spline thereto a clutch part 14 mounted thereon.

The numeral 15 designates operating mechanism embodying the invention, for moving the clutch part 14 into and out of operative position with another clutch part, not shown. The clutch part 14 may comprise a hub or sleeve 16 provided with key slots 18 to receive the keys 13. Integrally formed with said hub or sleeve 16 is an annular frusto-conical disk 20, having inner and outer conical surfaces 21 and 22 respectively.

The frame 10 has a pair of vertical walls 10a connected by a vertical web 10b. Formed on said web 10b is a horizontal bearing 25 and a pair of horizontally aligned bearings 26. Fixed to the web 10b of frame 10, as by bolts 27, and extending to one side thereof, is a horizontal bracket 28 having a pair of spaced upstanding ears 29 disposed on opposite sides of and below the shaft 12 and formed with horizontal bearings 30 aligned with the bearings 26. Said bracket 28 is also formed with a vertical flanged opening 31c centrally disposed with respect to bearings 30. Extending through each pair of aligned bearings 26 and 30 is a rotary shaft 31 parallel to shaft 12, for the purpose hereinafter appearing.

Journalled in the bearing 25 is a shaft 32 extending beyond said bearing in opposite directions. Fixed to one end 33 of the shaft 32, is an operating hand lever 34. Fixed to the opposite end 35 of said shaft is an arm 37. Slidably extending through opening 31c, in bracket 28, is a rod 38 interconnected by a link 39 to the outer end of the arm 37, for the purpose hereinafter appearing. Mounted on the shafts 31 and between the bearings 26 and 30, are a pair of similar symmetrically disposed levers 40, each having a sleeve 41 on one of said shafts and a downwardly extending arm 42 integrally formed with the sleeve. The levers are fixed to shafts 31 by set-screws, spline keys or by pins 31a. The lower ends of the arms 42 are interconnected by links 44 to the upper end of the rod 38. Extending upwardly from each sleeve 41 is an arm 45 carrying at the upper end thereof a roller 46 having an outer frusto-conical surface in contact with the outer conical surface 22 of the disk 20.

Mounted on the shafts 31, and fixed thereto by set-screws, spline keys, or by pins 31b, are a pair of similar symmetrically disposed members 47 located between levers 40 and bearings 30. Each of said members 47 has a sleeve portion 48 receiving said shaft, and an upwardly extending arm 50, carrying at the upper end a roller 51 having a frusto-conical surface 52 contacting the inner conical surface 21 of the disk 20. The members 40 and 47 do not have any sliding movement on shafts 31 due to contact with the disk 20 and the bearings 26 and 30, and because they are fixed to shafts 31 by pins 31a and 31b.

The rollers may be of rubber, composition, metal or any other suitable material. The arms 45 and 50 are preferably of the same length and in alignment so as to swing together in the manner explained in greater detail hereinafter.

Figure 2:
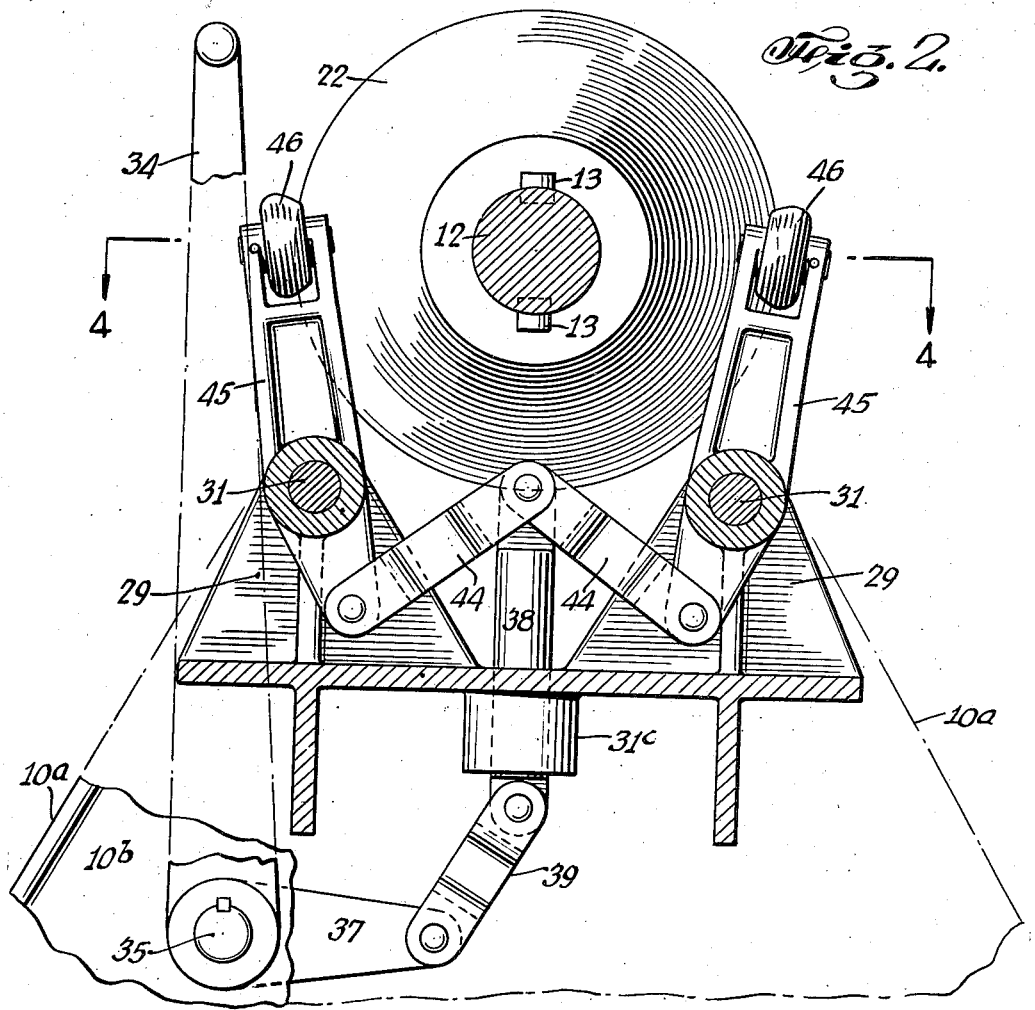
Fig. 2 is a cross-sectional view taken on line 2—2 of Fig. 1.
Figure 4:
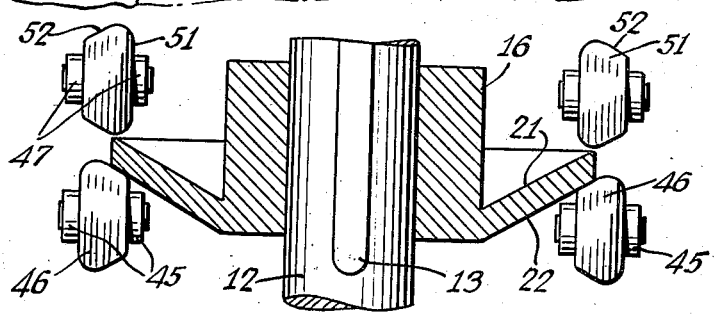
Fig. 4 is a cross-sectional view taken on line 4—4 of Fig. 2.

The operation of the clutch operating mechanism will now be described. As the shaft 12 is rotated, the disk 20 rotates therewith. Beginning with the parts as shown in Figs. 1 and 2, the rollers are substantially at the outer periphery of the disk, and the clutch part 14 is at its extreme left position looking at Fig. 1. To move the clutch part 14 to the right for engagement with another clutch part of any suitable kind, not shown, the hand lever 34 is moved in a clockwise direction from the position shown in Fig. 2 to the position shown in Fig. 3. During such operation the arm 37 is likewise turned in a clockwise direction to pull the rod 38 downwardly and swing the upper ends of the members 40 inwardly. Such movement causes the rollers 46 to press against the outer conical surface of the clutch part 14 for moving the latter to the right longitudinally of the shaft 12, and causing engagement thereof with the other clutch part, not shown in the drawings. During this movement the arms 50 being fixed to shafts 31, swing with the levers 40.

To release the clutch part 14, the handle 34 is swung in the opposite direction, moving the arms 45 of the members 40 outwardly and causing arms 50 to swing out and the rollers 51 to press against the inner surface of disk 20 to move the clutch 14 to the left for disengaging the same. The arms 50 thus follow the movement of the arms 45, the rollers 51 remaining in engagement with the inner conical surface 21 of the clutch disk 20 during movement of the clutch part to the left or right.

It will be understood that the hand lever 34 may be replaced by a foot pedal arrangement or other power device for actuating the mechanism 15.

In Fig. 7 there is shown a modified construction in which the members 47 are omitted. The rollers 46 press against the outer conical surface of the disk 20 for moving the clutch part 14 in one direction. To move the said clutch part in the opposite direction, there is provided a coil compression spring 60 disposed about the hub portion 16 for maintaining the disk 20 in contact with the rollers 46.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In combination with a shaft having a movable member thereon, said member being formed with a conical disk portion, means for causing movement of said member longitudinally of said shaft, said means comprising a pair of levers pivoted on axes parallel to the shaft and engaging a surface of said disk, and means for simultaneously rotating said levers in opposite directions.

2. In combination with a shaft having a movable member thereon, said member being formed with a conical disk portion, means for causing movement of said member longitudinally of said shaft, said means comprising a second member pivoted about an axis parallel to the axis of said disk, and a roller on said second member having a frusto-conical surface engaging a surface of said disk.

3. In combination, a shaft, a movable member splined thereto and having a frusto-conical disk portion having inner and outer conical surfaces on opposite sides of said disk, a shaft parallel to said first shaft, and members on said second shaft non-slidable with respect thereto and engaging said opposite surfaces of said disk.

4. A shaft, a movable member splined thereto and having a frusto-conical disk, a shaft parallel to said first shaft, a pair of members on said second shaft and connected thereto for rotation therewith, and rollers on said members engaging opposite sides of said disk, said rollers having surfaces inclined to conform to the inclination of the surfaces of the disk.

5. In combination, a frame formed with a bearing, a shaft journalled therein, a movable member splined to said shaft and being formed with a frusto-conical disk, a pair of shafts rotatably mounted on said frame and disposed parallel to said first shaft and on opposite sides thereto, a pair of levers fixed to said pair of shafts, rollers at the upper ends of said levers engaging said disk on opposite sides of said first shaft, and a pair of links interconnecting the opposite ends of said levers.

6. In combination, a frame having a bearing, a shaft journalled in said bearing, a movable member splined to said shaft and provided with a frusto-conical disk having inner and outer conical surfaces, said frame being formed with a second bearing, a second shaft journalled therein, a hand lever fixed to said second shaft, said frame being formed with a pair of aligned bearings disposed on opposite sides of the first shaft, a bracket fixed to said frame and having a pair of bearings aligned with the first mentioned pair of bearings respectively, a shaft in each pair of aligned bearings, a lever on each of said pair of shafts connected thereto for rotation therewith, and rollers on said levers engaging one surface of said disk on opposite sides of said first shaft and levers on said pair of shafts carrying rollers, engaging the other surface of said disk on opposite sides of said first shaft.

7. In combination, a frame having a bearing, a shaft journalled in said bearing, a movable member splined to said shaft and having a frusto-conical disk, said frame being formed with a second bearing, a second shaft journalled therein, a hand lever fixed to said second shaft, said frame being formed with a pair of aligned bearings disposed on opposite sides of the first shaft, a bracket fixed to said frame and having a pair of bearings aligned with the first mentioned pair of bearings respectively, a shaft in each pair of aligned bearings, a lever on each of said pair of shafts connected thereto for rotation therewith, and rollers on said levers engaging one surface of said disk on opposite sides of said first shaft, a member on each of said pair of shafts connected thereto for rotation therewith, having a roller thereon, contacting the other surface of said disk, an arm on said second mentioned shaft and connected by links to said pair of levers for swinging said levers simultaneously in opposite directions.

8. In combination, a frame having a bearing, a shaft journalled in said bearing, a movable member splined to said shaft and having a frusto-conical disk, said frame being formed with a second bearing, a second shaft journalled therein, a hand lever fixed to said second shaft, said frame being formed with a pair of aligned bearings disposed on opposite sides of the first shaft, a bracket fixed to said frame and having a pair of bearings aligned with the first mentioned pair of bearings respectively, a shaft in each pair of aligned bearings, a lever on each of said pair of shafts connected thereto for rotation therewith, rollers on said levers engaging one surface of said disk on opposite sides of said first shaft, a member on each of said pair of shafts connected thereto for rotation therewith, having a roller thereon, contacting the other surface of said disk, an arm on said second mentioned shaft and connected by links to said pair of levers for swinging said levers simultaneously in opposite directions, said rollers having conical surfaces engaging the conical surfaces of said disk.

9. In combination, a frame having a bearing, a shaft journalled in said bearing, a movable member splined to said shaft and having a frusto-conical disk, said frame being formed with a second bearing, a second shaft journalled therein, means for rotating said second shaft, said frame being formed with a pair of aligned bearings disposed on opposite sides of said first shaft, a bracket fixed to said frame and having a pair of bearings aligned with said first mentioned pair of bearings respectively, a shaft in each pair of aligned bearings parallel to said first shaft, a lever on each of said pair of shafts connected thereto for rotation therewith, rollers on said levers engaging one surface of said disk on opposite sides of said first shaft, a member on each of said pair of shafts connected thereto for rotation therewith, having a roller thereon contacting the other surface of said disk, an arm on said second shaft, said bracket being formed with a vertical opening, a rod extending through said vertical opening and connected by a link to said arm, and links connecting said pair of levers to said rod.

10. In combination, a frame having a bearing, a shaft journalled in said bearing, a movable member splined to said shaft and having a frusto-conical disk, said frame being formed with a second bearing, a second shaft journalled therein, means for rotating said second shaft, said frame being formed with a pair of aligned bearings disposed on opposite sides of said first shaft, a bracket fixed to said frame and having a pair of bearings aligned with said first mentioned pair of bearings respectively, a shaft in each pair of aligned bearings parallel to said first shaft, a lever on each of said pair of shafts connected thereto for rotation therewith, rollers on said levers engaging one surface of said disk on opposite sides of said first shaft, a member on each of said pair of shafts connected thereto for rotation therewith, having a roller thereon contacting the other surface of said disk, an arm on said second shaft, said bracket being formed with a vertical opening, a rod extending through said vertical opening and connected by a link to said arm, and links connecting said pair of levers to said rod, said rollers having conical surfaces conforming to the conical surfaces of said disk.

11. In combination, a shaft, a movable member splined thereto and having a frusto-conical disk portion, a pair of members pivoted on pair of axes parallel to said shaft and engaging a surface of said disk on opposite sides of said shaft, and means for simultaneously rotating said pivoted members in opposite directions.

12. In combination, a shaft, a movable member splined thereto and having a frusto-conical disk, members pivoted about axes parallel to said shaft and engaging said disk on opposite sides of said shaft, a pair of links interconnecting said pivoted members, said links being pivoted together, and means for moving the pivot which interconnects said links for causing pivotal movement of said pair of members in opposite directions.

EDWARD DEGELMAN.